US011767867B2

(12) United States Patent
Davis et al.

(10) Patent No.: US 11,767,867 B2
(45) Date of Patent: Sep. 26, 2023

(54) PIVOTING JOINT FOR WOODEN FURNITURE

(71) Applicant: Clark Davis, Provo, UT (US)

(72) Inventors: Clark Davis, Provo, UT (US); Paul Schmidt, Lehi, UT (US)

( * ) Notice: Subject to any disclaimer, the term of this patent is extended or adjusted under 35 U.S.C. 154(b) by 56 days.

(21) Appl. No.: 17/529,256

(22) Filed: Nov. 17, 2021

(65) Prior Publication Data

US 2022/0154751 A1 May 19, 2022

Related U.S. Application Data

(60) Provisional application No. 63/115,006, filed on Nov. 17, 2020.

(51) Int. Cl.
*F16B 12/24* (2006.01)
*F16C 11/10* (2006.01)

(52) U.S. Cl.
CPC ............ *F16B 12/24* (2013.01); *F16C 11/103* (2013.01)

(58) Field of Classification Search
CPC ............... F16B 2012/463; F16B 12/24; Y10T 403/32327; Y10T 403/32344; Y10T 403/32352; Y10T 403/32361; Y10T 403/32377; Y10T 403/32581; F16C 11/103; F16C 2314/70
See application file for complete search history.

(56) References Cited

U.S. PATENT DOCUMENTS 456,353 A 7/1891 Bower
919,257 A 4/1909 Seydewitz
981,532 A 1/1911 Cary
1,036,164 A * 8/1912 Teppert .................... B60G 5/04 403/98
1,061,297 A 5/1913 Johnson
1,419,647 A 6/1922 Shepherdson
1,431,823 A 10/1922 Georges
1,747,900 A 2/1930 Jenny
1,903,631 A 4/1933 Morrison
1,940,117 A 12/1933 Carpos
1,981,646 A 11/1934 Hamley
2,240,256 A 4/1941 Elmendorf
2,279,864 A 4/1942 Eide
(Continued)

FOREIGN PATENT DOCUMENTS

CA 1255355 6/1989
CH 281702 3/1952
(Continued)

OTHER PUBLICATIONS

Celery Rocking Chair viewed at http://www.eroomservice.com/manufacturer/celery/ circa Dec. 3, 2011.
(Continued)

*Primary Examiner* — Matthew R McMahon
(74) *Attorney, Agent, or Firm* — PETERSON IP; Brett Peterson

(57) ABSTRACT

A motion control and lock mechanism for wooden furniture such as a climbing triangle is provided. The lock mechanism provides secure stop against further motion and holds the furniture in the open or closed position. The lock mechanism is easily fabricated with a CNC router while cutting plywood furniture panels.

20 Claims, 15 Drawing Sheets

(56) References Cited

U.S. PATENT DOCUMENTS 2,334,912 A 11/1943 Eide
2,369,930 A 2/1945 Wagner
D144,730 S 5/1946 Perrault
2,418,731 A 4/1947 Seitz
2,479,086 A 8/1949 Silverman
2,481,671 A 9/1949 John et al.
2,486,987 A 11/1949 Scarlett
2,518,955 A 8/1950 Stelzer
2,534,413 A 12/1950 Cenis
2,551,071 A 5/1951 Tyncs
D164,552 S 9/1951 Curtis
2,595,002 A 4/1952 Schneider
2,602,012 A 7/1952 Doty
2,615,771 A 10/1952 Curtis
2,632,498 A 3/1953 Curtis
2,672,181 A 3/1954 Rose
2,677,491 A 5/1954 Burger
2,703,724 A 3/1955 Der Yuen
2,720,253 A 10/1955 Turner
2,745,591 A 5/1956 Holt
2,786,789 A 3/1957 Carlson
2,792,877 A 5/1957 West
2,801,895 A 8/1957 Gass
2,825,101 A 3/1958 Rubsnstein
2,908,400 A 10/1959 Richter
3,053,598 A 9/1962 Cheslow
3,069,216 A 12/1962 Mona
3,089,675 A 5/1963 Lozier
3,149,880 A 9/1964 Steuer
3,186,027 A 6/1965 Merillat
3,262,405 A 7/1966 Sutton
3,300,170 A 1/1967 Charles
3,300,245 A 1/1967 Rumble
D212,601 S 11/1968 Rubenstein
3,410,441 A 11/1968 Rhyne
3,527,497 A 9/1970 Self
3,547,491 A 12/1970 Bovasso
3,578,385 A 5/1971 Stiglitz
3,599,822 A 8/1971 Johnson
3,603,274 A 9/1971 Ferdinand
3,603,656 A 9/1971 Ferman
3,636,893 A 1/1972 Lange
3,674,328 A 7/1972 White et al.
3,684,285 A 8/1972 Kane
3,692,201 A 9/1972 Garduna
3,697,363 A 10/1972 Martinez
3,783,801 A 1/1974 Engman
3,788,700 A 1/1974 Wartes
3,811,715 A * 5/1974 Brudy .................. B60R 1/0617
403/93
3,812,977 A 5/1974 Glassman
3,831,533 A 8/1974 Kellogg
3,847,435 A 11/1974 Skinner
4,021,128 A 5/1977 Chiames
4,055,924 A 11/1977 Beaver
D247,596 S 3/1978 Osamu
4,082,356 A 4/1978 Johnson
4,089,084 A * 5/1978 Droz ...................... E05D 11/06
403/116
4,099,472 A 7/1978 Kellogg
4,103,818 A 8/1978 Raubenheimer
4,140,065 A 2/1979 Chacon
4,153,311 A 5/1979 Takahashi
4,158,277 A 6/1979 Krempp et al.
4,188,067 A 2/1980 Elmer
4,191,113 A 3/1980 Hogberg
4,202,581 A 5/1980 Fleishman
4,225,180 A 9/1980 Gillis
4,258,464 A 3/1981 Ullman
4,348,052 A 9/1982 Roland
4,358,047 A 11/1982 Raubenheimer
4,390,204 A 6/1983 Fleishman
4,419,028 A 12/1983 Roland
4,433,753 A 2/1984 Watson
4,433,843 A 2/1984 Bricco
4,492,332 A 1/1985 Collins
4,501,512 A 2/1985 Hiltz
4,509,794 A 4/1985 Roland
4,533,174 A 8/1985 Fleishman
4,544,092 A 10/1985 Palmer
4,548,350 A 10/1985 Engle
4,574,917 A 3/1986 Stoddard
4,591,090 A 5/1986 Collins
4,593,950 A 6/1986 Vittorio
4,595,105 A 6/1986 Gold
D289,234 S 4/1987 Hoult
4,685,609 A 8/1987 Ferrari
4,706,573 A 11/1987 Sielaff
4,712,837 A 12/1987 Swilley
4,759,449 A 7/1988 Gold
D299,087 S 12/1988 Bruce
4,841,878 A 6/1989 Kriegsman
D302,216 S 7/1989 Roland
4,846,530 A 7/1989 Noble
4,867,327 A 9/1989 Roland
4,878,439 A 11/1989 Samson
4,882,807 A * 11/1989 Frye ........................ B60N 2/85
16/361
4,884,420 A 12/1989 Finkel
4,900,276 A 2/1990 Doutrich
4,926,759 A 5/1990 Vitsky et al.
4,930,753 A 6/1990 Alvyn
4,934,765 A 6/1990 Slifer
5,011,228 A 4/1991 Marcantel
5,069,144 A 12/1991 Williford
5,082,329 A 1/1992 Mars
5,253,594 A 10/1993 Sideris
5,253,595 A 10/1993 Heidmann
5,263,766 A 11/1993 McCullough
5,275,467 A 1/1994 Kawecki
5,343,816 A 9/1994 Sideris
5,354,589 A 10/1994 Wass
5,367,964 A 11/1994 Hockensmith
5,387,027 A 2/1995 Maloney
5,454,331 A 10/1995 Green
5,478,145 A 12/1995 Kamachi
5,605,378 A 2/1997 Oyediran
5,613,449 A 3/1997 Pullman
5,644,995 A 7/1997 Gurwell et al.
5,655,812 A 8/1997 Albecker
5,669,107 A * 9/1997 Carlsen ................ E05D 11/082
297/411.32
5,706,741 A 1/1998 Thorp
5,720,537 A 2/1998 Lutz
5,752,611 A 5/1998 Nakagawa
5,765,922 A 6/1998 Hsia
5,803,548 A 9/1998 Battle
5,803,561 A 9/1998 Puehlhorn
5,881,653 A 3/1999 Pfister
5,901,521 A 5/1999 Guy
5,921,631 A 7/1999 Bush
5,927,816 A 7/1999 Hsu
5,941,377 A 8/1999 Hart
5,992,938 A 11/1999 Jones
6,029,584 A 2/2000 Cochrane
6,036,270 A 3/2000 Bufalini
6,041,920 A 3/2000 Hart
D422,799 S 4/2000 Dworshak et al.
6,053,585 A 4/2000 Osen
6,109,695 A 8/2000 Kahwaji
6,126,022 A 10/2000 Merkel
6,155,641 A 12/2000 Frost
6,174,116 B1 1/2001 Brand
6,189,974 B1 2/2001 Beck
6,247,754 B1 6/2001 Vanderaue et al.
6,283,564 B1 9/2001 Corson
6,347,772 B1 2/2002 L'Hotel
6,359,174 B1 3/2002 Jones
6,378,707 B1 4/2002 Taggert
6,427,956 B1 * 8/2002 Heckmann ............ B60N 2/753
248/118
6,443,076 B1 9/2002 Case
6,453,973 B1 9/2002 Russo
6,532,878 B2 3/2003 Tidemann

(56) References Cited

U.S. PATENT DOCUMENTS 6,595,378 B2 7/2003 Wang
6,615,746 B2 9/2003 Bart
6,615,999 B1 9/2003 Culp
6,619,749 B2 9/2003 Willy
6,675,979 B2 1/2004 Taylor
6,769,369 B1 8/2004 Brandenberg
6,807,912 B2 10/2004 Willy
D499,577 S 12/2004 Willy
6,845,871 B1 1/2005 Culp
6,848,747 B1 2/2005 Robinson
RE38,707 E 3/2005 Merkel
6,895,870 B1 5/2005 Bizlewicz
6,955,401 B1 10/2005 Shoulberg
6,994,222 B2 2/2006 Hunt
7,066,548 B2 6/2006 Butler
7,114,300 B1 10/2006 Culp
7,168,766 B2 1/2007 Pelletier
7,219,962 B2 5/2007 Stone
D547,076 S 7/2007 Hughes et al.
7,255,403 B2 8/2007 Butler
7,290,342 B2 * 11/2007 Hartmann ................. B27B 9/02 403/111
7,300,110 B1 11/2007 Debien
7,386,960 B2 6/2008 Molteni
7,488,136 B2 * 2/2009 Chen ...................... F16M 11/10 403/96
7,533,940 B1 5/2009 Zook
7,631,605 B2 12/2009 Willy
7,765,942 B2 8/2010 Choi
7,856,772 B1 12/2010 Culp et al.
8,123,311 B2 2/2012 Nilsson
8,167,377 B2 5/2012 Kovach
8,215,245 B2 7/2012 Morrison
8,220,399 B2 7/2012 Berent et al.
8,332,917 B2 12/2012 Forster
8,459,476 B2 6/2013 Malekmadani
8,528,979 B2 9/2013 College
8,590,976 B2 11/2013 Davis
8,651,298 B2 2/2014 Beaty
8,667,911 B2 3/2014 Brandenberg
8,863,470 B2 10/2014 Bottorff
9,220,994 B2 12/2015 Murphy
9,277,814 B2 3/2016 Winker
9,282,819 B2 3/2016 Blake
9,447,804 B2 9/2016 Andersson
9,534,623 B2 1/2017 Anderson et al.
9,615,663 B2 4/2017 Davis
9,668,573 B2 6/2017 Salani
9,706,836 B1 7/2017 Nelson
9,719,542 B2 8/2017 Cappelle
10,138,917 B2 11/2018 Koch
10,195,974 B2 * 2/2019 Zhang .................... B60N 2/753
10,227,162 B2 3/2019 Davis
10,415,612 B2 9/2019 Davis
10,434,912 B2 * 10/2019 Zapf ...................... B60N 2/753
10,660,433 B1 5/2020 Jomaa
10,687,617 B2 6/2020 Davis
10,823,214 B2 11/2020 Davis
11,083,293 B2 8/2021 Davis
11,085,474 B2 8/2021 Davis
11,154,137 B2 10/2021 Davis
2003/0107255 A1 6/2003 Willy
2004/0056526 A1 3/2004 Willy
2004/0227041 A1 11/2004 Lewis
2005/0155232 A1 * 7/2005 Bocka ....................... B27B 9/02 30/377
2007/0169429 A1 7/2007 Wu
2007/0187348 A1 8/2007 Malekmadani
2008/0074013 A1 3/2008 Ahlgrim et al.
2008/0302748 A1 12/2008 Tsai
2009/0066140 A1 3/2009 Berent et al.
2009/0084740 A1 4/2009 Lin
2010/0003077 A1 1/2010 Kelley
2012/0080910 A1 4/2012 Davis
2013/0062294 A1 3/2013 Beaty
2013/0080286 A1 3/2013 Rotholz
2013/0170904 A1 7/2013 Cappelle
2014/0048176 A1 2/2014 Susnjara
2014/0048177 A1 2/2014 Susnjara
2014/0059829 A1 3/2014 Weber
2014/0186104 A1 7/2014 Hamberger
2014/0263130 A1 9/2014 Davis
2015/0144578 A1 5/2015 Maiden
2015/0173989 A1 6/2015 Mitchell
2015/0183177 A1 7/2015 Blay
2015/0230600 A1 8/2015 Schulte
2015/0335155 A1 11/2015 Winker
2017/0023043 A1 1/2017 Koelling et al.
2017/0058926 A1 3/2017 Takubo
2017/0079426 A1 3/2017 Davis
2017/0086578 A1 3/2017 Nowak
2017/0099961 A1 4/2017 Church
2017/0265650 A1 9/2017 Adair
2017/0321734 A1 11/2017 Maertens
2017/0340107 A1 11/2017 Shen
2018/0112696 A1 4/2018 Davis
2019/0038023 A1 2/2019 Stocker
2019/0040890 A1 2/2019 Davis
2019/0059593 A1 2/2019 Davis
2019/0059594 A1 2/2019 Davis
2019/0085886 A1 3/2019 Davis
2019/0107131 A1 4/2019 Davis
2019/0254424 A1 8/2019 Rassat
2020/0370585 A1 11/2020 Huang

FOREIGN PATENT DOCUMENTS

DE 1529719 5/1969
DE 2100168 11/1972
DE 3925302 2/1991
DE 9201692 4/1992
DE 29914896 12/1999
DE 29906711 1/2000
DE 102007058662 6/2009
DE 102014006155 10/2014
EP 0299695 1/1989
FR 1300853 8/1962
FR 2634991 2/1990
FR 2654164 5/1991
GB 143840 12/1920
GB 810752 3/1959
GB 2353080 2/2001
NL 1025719 9/2005
WO WO 2005-085656 9/2005

OTHER PUBLICATIONS

PlyGrid Shelves viewed at http://offi.com/products/offikids/PLYGRID.php?p2c=249 circa Dec. 3, 2011.
Snap Table viewed at http://www.offi.com/pdfs/snaptable.pdf circa Dec. 3, 2011.
Furniture viewed at http://www.playatech.com/product_list.php circa Dec. 3, 2011.
Arabic Table viewed at http://www.plydea.com/support/assemblypdf.html circa Dec. 3, 2011.
Blue7Chair viewed at http://www.plydea.com/support/assemblypdf.html circa Dec. 3, 2011.
First Desk viewed at http://www.plydea.com/support/assemblypdf.html circa Dec. 3, 2011.
Rinaldo Chair viewed at http://www.plydea.com/support/assemblypdf.html circa Dec. 3, 2011.
Tuffet Stool viewed at http://www.plydea.com/support/assemblypdf.html circa Dec. 3, 2011.
WasteNot Basket viewed at http://www.plydea.com/support/assemblypdf.html circa Dec. 3, 2011.
Winehold Wine Rack viewed at http://www.plydea.com/support/assemblypdf.html circa Dec. 3, 2011.

* cited by examiner

PIVOTING JOINT FOR WOODEN FURNITURE

PRIORITY

The present application claims the benefit of U.S. Provisional Application Ser. No. 63/115,006, filed Nov. 17, 2020, which is herein incorporated by reference in its entirety.

THE FIELD OF THE INVENTION

The present invention relates to furniture. In particular, examples of the present invention relates to a pivoting joint for furniture.

BACKGROUND

There is an increasing demand for more natural furnishings, such as furniture which is made from wood instead of plastic or metal. Wooden learning and activity furniture for children, for example, is desirable. Articles of furniture made from wood often require different joints and assembly techniques as compared to metal or plastic furniture in order to provide sufficient strength, durability, and longevity.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
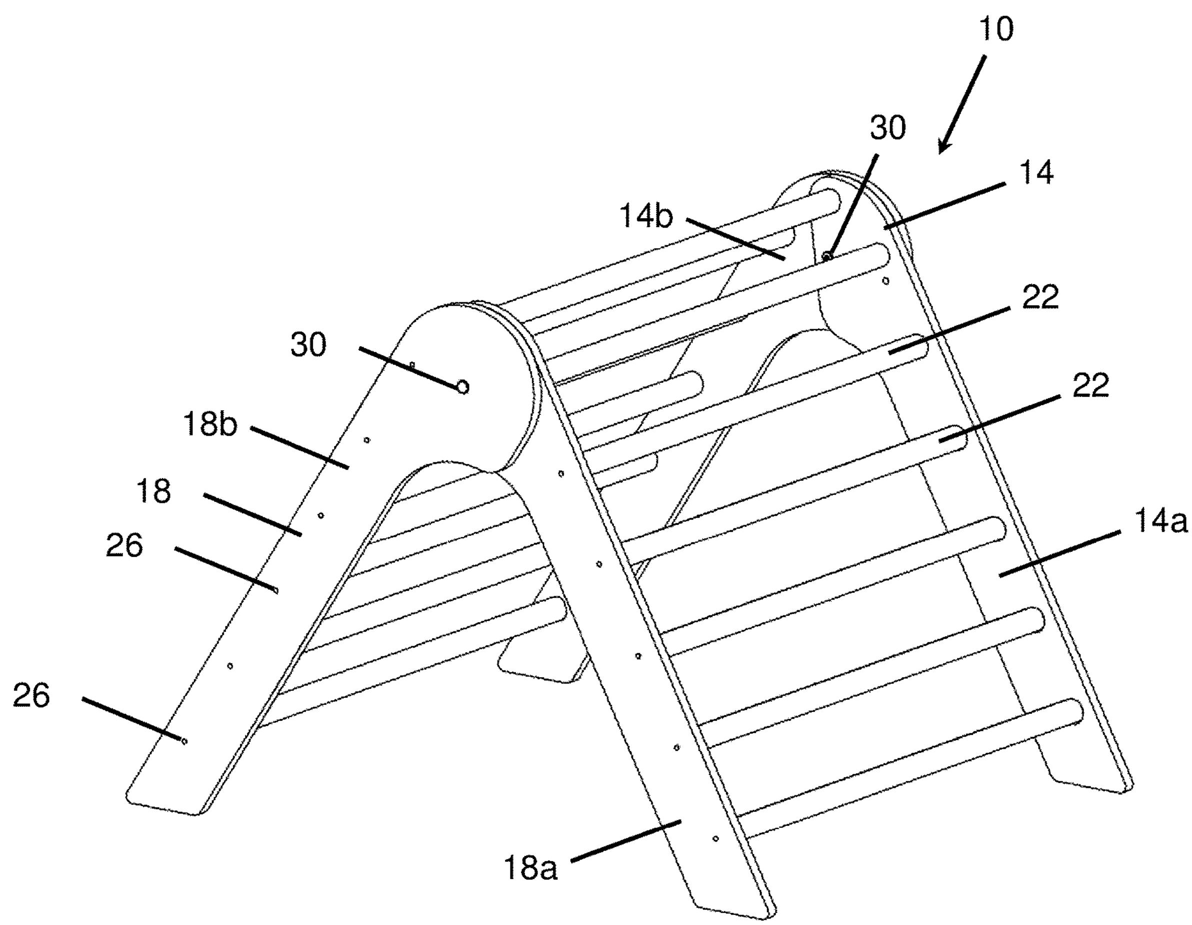
FIG. 1 is a drawing which shows a perspective view of a climbing triangle with a pivot and lock mechanism.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a number or numerical range endpoint by providing that a given value may be "a little above" or "a little below" the number or endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

The present disclosure describes a pivot control and lock mechanism which allows for pivoting motion between a first furniture member and a second furniture member. The lock mechanism allows for control of the range of pivoting motion with a high degree of strength to resist overextension of the pivoting member. The lock mechanism also provides for one or more detent positions located along the range of pivoting motion. The lock mechanism may provide some residual tension at the detent locations to provide increased stiffness to the pivoting joint. The pivot and lock mechanism may be applied to different pieces of furniture such as a climbing triangle, table, footrest, chair, etc. The pivot and lock mechanism are well suited to control pivoting motion of legs. Accordingly, the first furniture member may be an inner leg and the second furniture member may be an outer leg that are attached together at a pivot joint, such as are shown in the example climbing triangle. The first furniture member may be a table apron or furniture rail and the second member may be a leg.

Turning now to FIG. 1, a perspective view of an example piece of furniture 10 is shown. The example furniture 10 is a climbing triangle for children. A climbing triangle gives a young child a safe environment to explore and play while they gain strength and coordination. Many persons who purchase climbing triangles desire the natural aesthetic of a wooden climbing triangle 10. The climbing triangle 10 may be formed primarily from plywood such as birch plywood and wooden dowels. Plywood may be used to form sides 14, 18 of the climbing triangle 10 and dowel rods may be used to form step rungs 22. The steps 22 are attached to the sides 14, 18 with fasteners 26 such as pegs, screws, bolts, etc. Each of the sides 14, 18 includes an inner leg 14*a*, 18*a* and an outer leg 14*b*, 18*b*. The inner legs 14*a*, 18*a* are attached to the outer legs 14*b* 18*b* at a pivot joint 30. The pivot joint 30 may include a dowel, bolt, or pin which passes through the first and second furniture members (legs) and allows them to pivot about the joint. The pivot joint 30 allows the inner legs 14*a*, 18*a* and to outer legs 14*b*, 18*b* to be pivoted towards each other to collapse the climbing triangle 10 for storage, moving, etc.

One problem that arises in creating such a climbing triangle 10 is making the deployed climbing triangle 10 sufficiently strong and safe without additional bolts or braces and without creating additional holes or features which detract from the aesthetic or allow a child's fingers to become stuck or pinched. A bottom brace extending between the bottoms of the legs 14*a*, 14*b*, 18*a*, 18*b* is aesthetically undesirable and reduces the ability of a child to climb through the triangle 10 between the legs 14, 18. Additional fasteners around the pivot 30 are also undesirable. The climbing triangle 10 uses a hidden lock mechanism near the pivot 30 which locks the legs 14*a*, 14*b*, 18*a*, 18*b* in an open or closed position. The lock mechanism may be concealed between the inner legs and the outer legs in both an open and closed position. The lock mechanism does not detract cosmetically from the climbing triangle 10 and does not provide any exposed feature which may pinch or trap child fingers.

Figure 2:
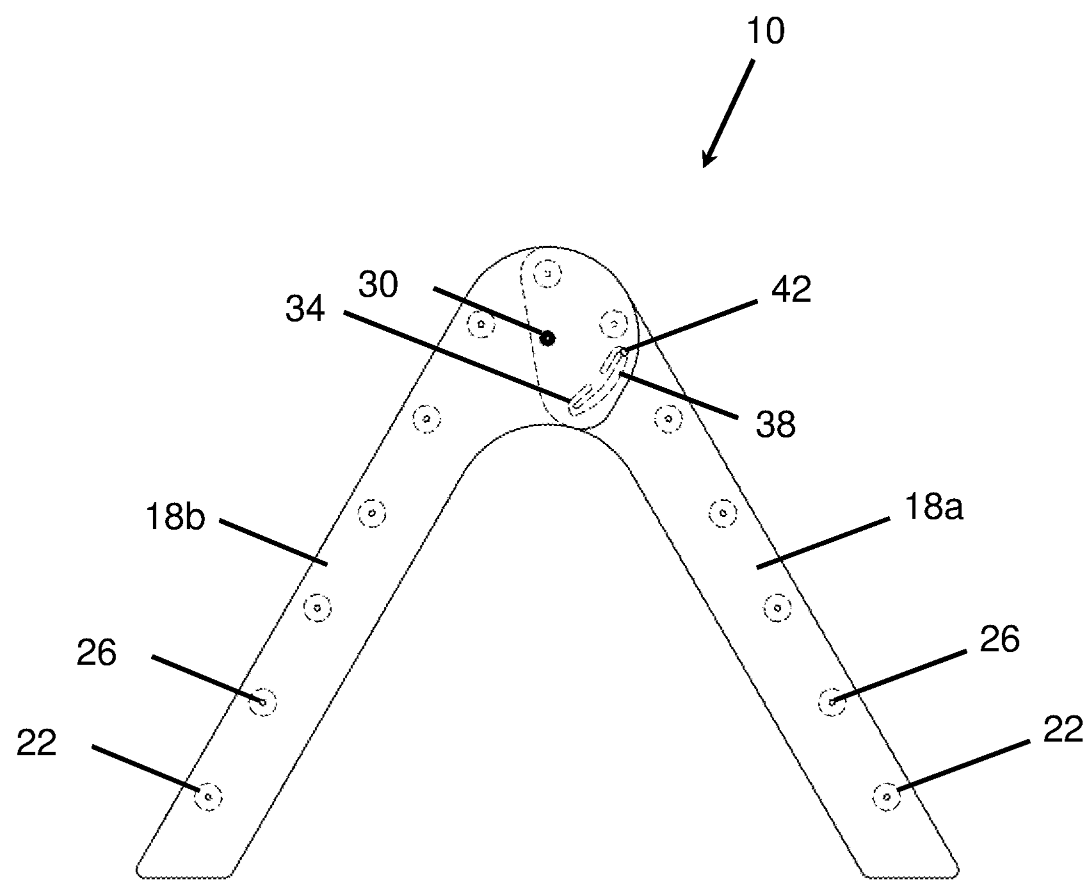
FIG. 2 is a drawing which shows an end view of the climbing triangle in an open configuration.
Figure 3:
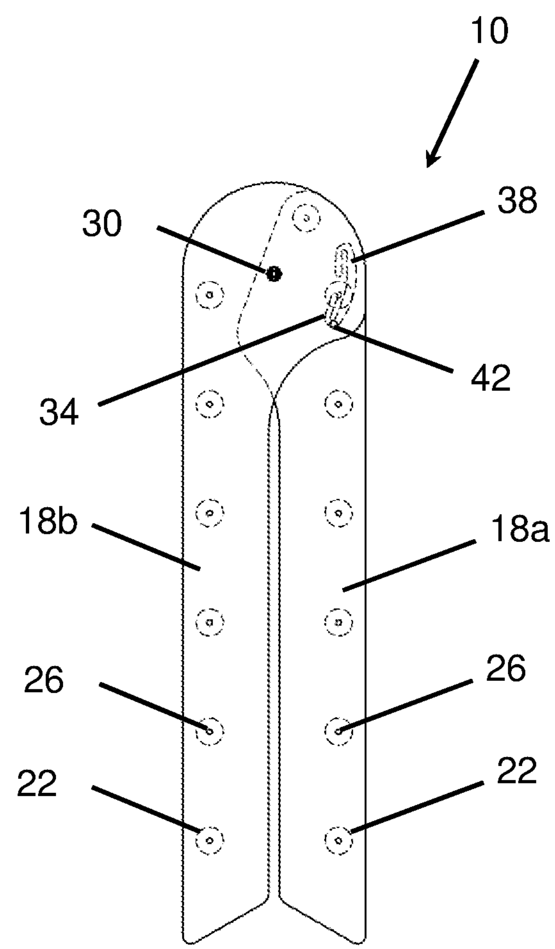
FIG. 3 is a drawing which shows an end view of the climbing triangle in a closed configuration.

FIG. 2 shows a side view of the climbing triangle 10 in an open configuration. The edge of the inner leg 18*a* which is located behind the outer leg 18*b* is shown in dashed lines for reference. FIG. 3 shows a similar side view of the climbing triangle 10 in a closed configuration. When open, there is a 60 degree angle between the inner legs 14*a*, 18*a* and the outer legs 14*b*, 18*b* so that the side view shape of the climbing triangle 10 approximates an equilateral triangle while in use. The top ends of the legs 14*a*, 18*a*, 14*b*, 18*b* are cut in a circular shape around the pivot 30. This forms a smooth and pleasing shape. The bottoms of the legs 14*a*, 18*a*, 14*b*, 18*b* are cut to an angle matching the open angle between the legs to provide stable footing on a floor surface. For the configuration of climbing triangle 10 which is shown, there are two steps 22 which are attached to the top of the inner legs 14*a*, 18*a* whose fasteners 26 are covered by the outer legs 14*b*, 18*b* and are hidden.

The climbing triangle lock mechanism 34 is located between the inner legs 14*a*, 18*a* and the outer legs 14*b*, 18*b* around the pivot 30. A lock mechanism 34 is formed on both sides of the climbing triangle 10. The lock mechanism 34 is formed in the plywood and includes features formed in both the inner legs 14*a*, 18*a* and the outer legs 14*b*, 18*b*. As can be seen comparing FIGS. 2 and 3, the lock mechanism 34 may be positioned such that it is entirely concealed between the upper ends of the inner legs 14*a*, 18*a* and the outer legs 14*b*, 18*b*. This maintains the aesthetic appeal of the climbing triangle 10 and also creates a lock mechanism 34 where a child cannot get their finger pinched or caught in the lock mechanism.

The lock mechanism 34 includes a slot 38 and a pin 42 which moves within the slot 38. The pin 42 is placed in a hole 54 which is formed in the inner legs 14*a*, 18*a*. The slot 38 is formed in the outer legs 14*b*, 18*b*. Alternatively, the pin 42 could be located in the outer legs 14*b*, 18*b* with the slot 38 located in the inner legs 14*a*, 18*a*. The slot 38 and pin 42 are located a distance from the pivot 30 which is less than the radius of the tops of the legs 14*a*, 18*a*, 14*b*, 18*b*. The slot 38 and the pin 42 are also positioned where they do not interfere with the steps 22 and where they remain concealed between the inner legs 14*a*, 18*a*, and the outer legs 14*b*, 18*b*. During use of the climbing triangle 10, the legs are pivoted about the pivot 30 to open the climbing triangle for use or to close the climbing triangle for storage. As the legs are pivoted relative to each other, the pin 42 moves within the slot 38 between a first end of the slot 38 and a second end of the slot 38. The pin 42 is held at the first end of the slot 38 or the second end of the slot 38 by a flexible finger which engages the pin 42.

Figure 4:
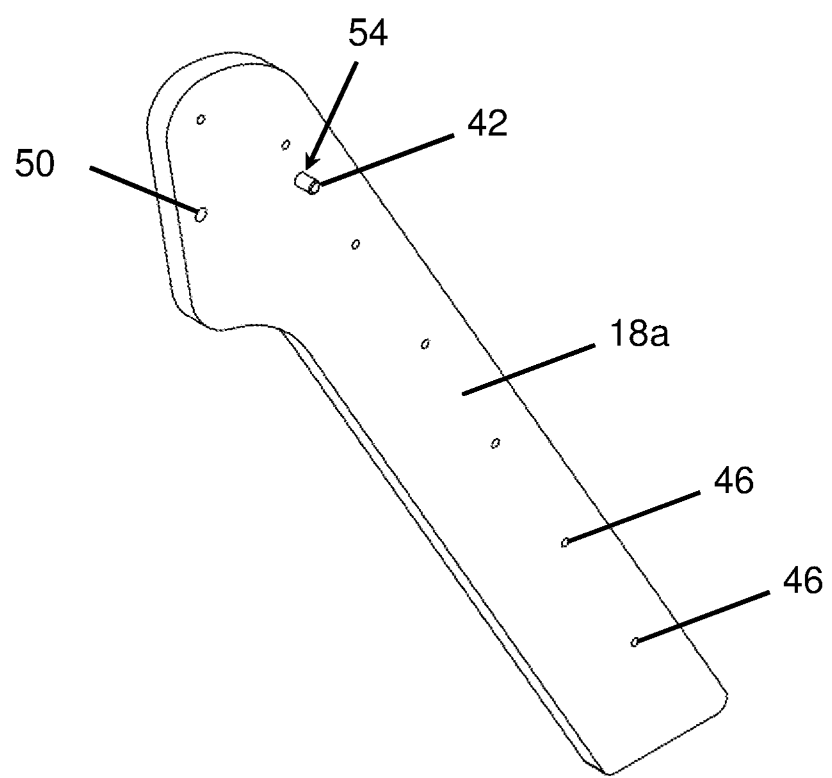
FIG. 4 is a drawing which shows a perspective view of one of the legs of the climbing triangle.

FIG. 4 shows a perspective view of an inner leg 18*a*. The outside face of the inner leg 18*a* is shown. The inner leg 18*a* includes a plurality of holes 46 which receive fasteners 26 to attach steps 22 to the inner leg 18*a*. A hole 50 receives a bolt, dowel, or other fastener to form the pivot 30. The fasteners 26 are flush with the surface or sufficiently close to the surface of the inner leg 18*a* to not interfere with rotation of the inner leg and outer leg about the pivot 30. The lock mechanism pin 42 is inserted into a corresponding pin hole 54. The step fastener holes 46, the pivot hole 50, and the lock mechanism pin hole 54 may be easily formed by a CNC router while cutting the inner leg 18*a*. If desired, the pin hole 54 may be a blind hole which does not penetrate completely through the inner leg 18*a*. The lock pin 42 fits tightly within the lock pin hole 54 and the lock pin 42 is pressed into the lock pin hole 54 before assembly of the pivot joint 30.

Figure 5:
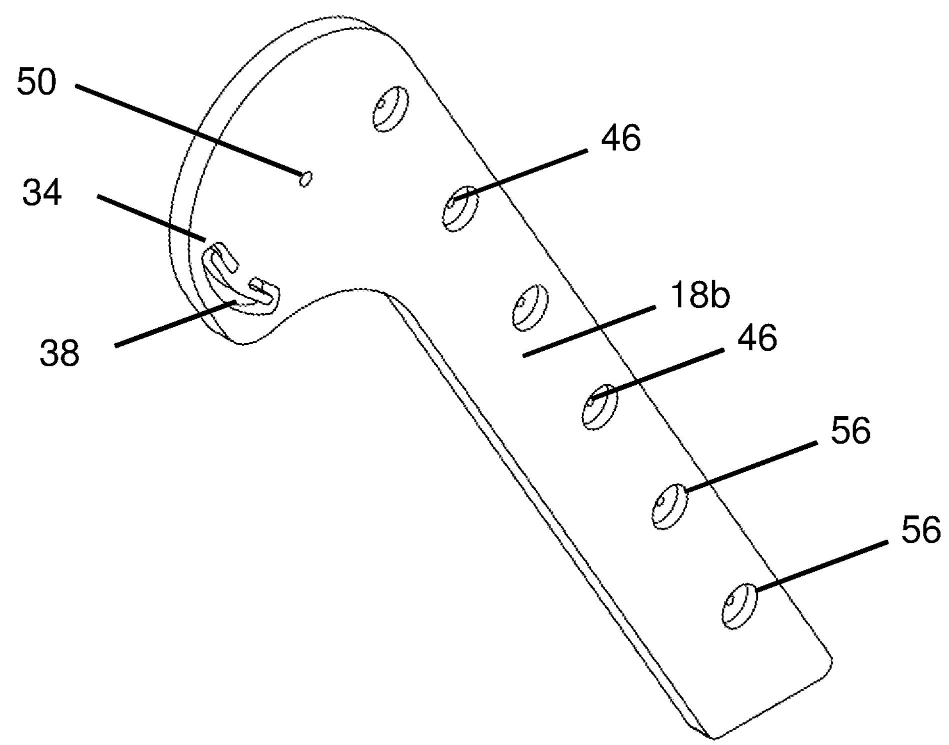
FIG. 5 is a drawing which shows a perspective view of another of the legs of the climbing triangle.

FIG. 5 shows a perspective view of an outer leg 18*b*. The inside face of the outer leg 18*b* is shown. The outer leg 18*b* includes a plurality of holes 46 which receive fasteners 26 to attach steps 22 to the inner leg 18*a*. The inside face of the legs include recesses 56 which receive and support the steps 22. The ends of the steps 22 fit into recesses 56 in the inside faces of the legs 14*a*, 14*b*, 18*a*, 18*b*, and fasteners 26 pass through fastener holes 46 in the legs to secure the steps 22 to the legs. A hole 50 receives the bolt, dowel, or other fastener to form the pivot 30 between the inner leg and the outer leg. The lock mechanism slot 38 may be cut into the outer leg 18*b* by a CNC router while cutting the other holes and the part itself. The slot 38 is formed partially through the plywood used for the outer leg 18*b*. As an example, the slot 38 may be cut with a depth which is about 0.05 or 0.1 inches less than the thickness of the plywood. Accordingly, the outside of the outer leg 18*b* is smooth and does not show the slot 38. When the inner leg 18*a* and outer leg 18*b* are attached together, a pivot element such as a bolt or dowel joins the legs together at the pivot holes 50. The pin 42 extends into the slot 38 and travels in the slot 38 as the furniture is moved into an open or closed position.

Figure 6A:
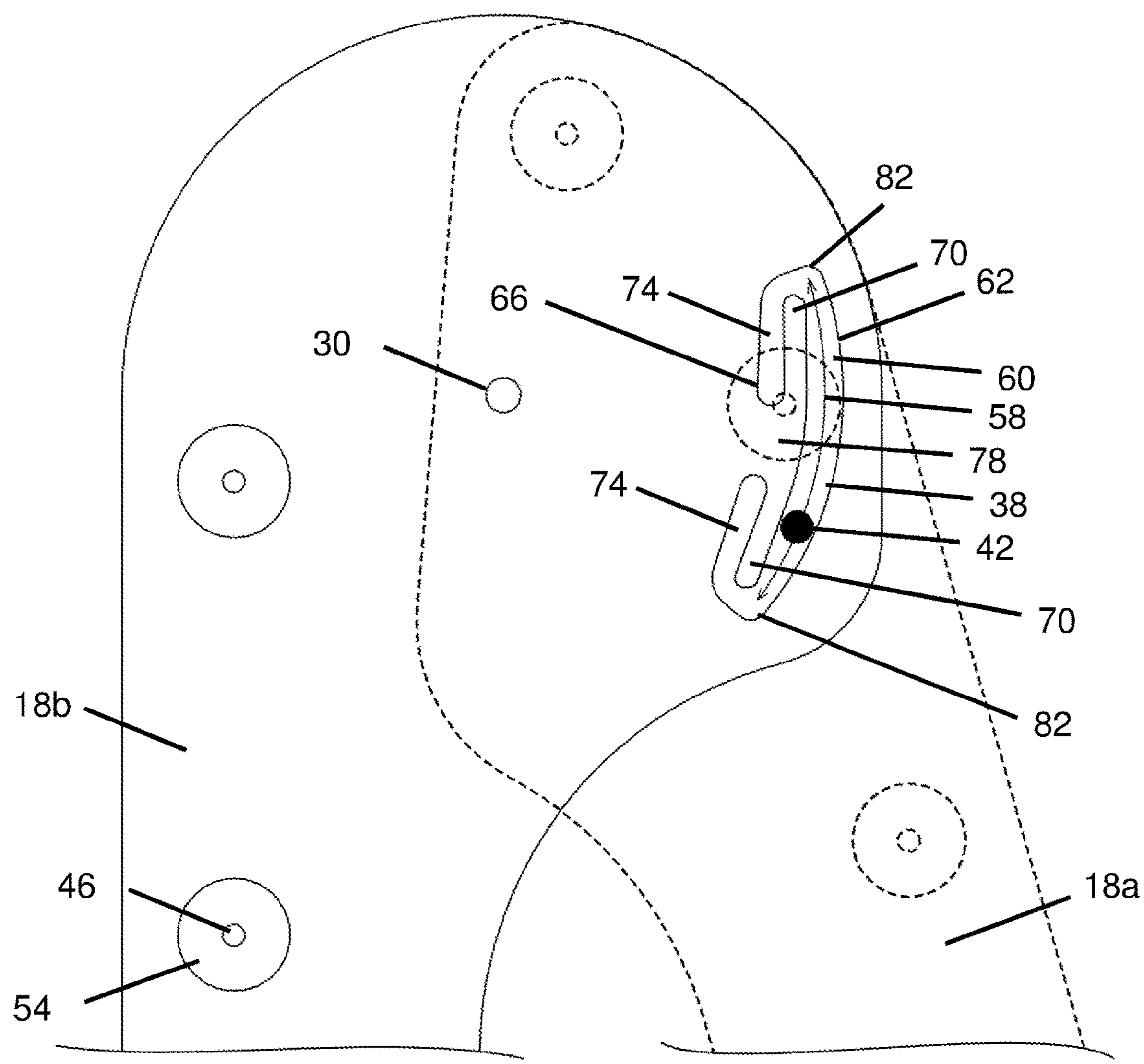
FIG. 6A is a drawing which shows a detailed view of the climbing triangle lock mechanism.

FIG. 6A shows a close-up view of the pivot joint between the inner leg 18*a* and the outer leg 18*b*. The inner leg 18*a* and outer leg 18*b* pivot relative to each other about a pivot point 30. Accordingly, the pin 42 moves through the slot 38 in a round arc 58 which is centered around the pivot hole 50 and which has a radius equal to the distance between the center of the pin hole 54 and the center of the pivot hole 50. The slot 38 is formed with a travel section 60, first and second ends 82, and relief sections 74. The pin 42 moves through the travel section 60 of the slot 38 between a first end 82 and a second end 82 of the slot 38 while moving between open and closed furniture positions. The outer wall 62 of the slot 38 that is farthest from the pivot 30 is cut sufficiently to not interfere with the pin 42 as it travels through the travel section 60. The outer wall 62 may typically be cut in an arcuate shape with a radius centered on the pivot 30 when the pin 42 travels through an arc 58. The inner side 66 of the slot 38 includes relief sections 74 which form fingers 70. Both ends of the inner side 66 of the slot 38 include relief sections 74 which extend around the ends of the fingers 70 and which extend behind the fingers 70 for a distance. The relief sections 74 are generally parallel to the travel section 60 and offset from the travel section 60 so that the fingers 70 are formed between the travel section 60 and relief sections 74. A small connecting section of the slot extends between the travel section 60 and the relief section 74. In the example configuration, the connecting sections extend generally perpendicularly (e.g. within about 5 or about 10 degrees of perpendicular) to the travel path 58/travel section 60 of the slot and the relief sections 74 extend generally parallel (e.g. within about 5 or 10 degrees of parallel) to the travel section 60. A section of solid material 78 connects the fingers 70 to the body of the outer leg 18*b*. The fingers 70 extend generally parallel to the travel section 60 of the slot 38. The fingers 70 have root sections which are not cut by the slot 38 and attach the finger to the leg/furniture piece. The root sections of the fingers 70 are those connected to the solid material 78 or otherwise connected to the bulk of the furniture piece. The fingers 70 have ends which terminate adjacent detent positions along the travel path of the pin 42. The ends of the fingers 70 are the distal ends extending away like peninsulas from the root sections. In the example furniture piece, the finger ends terminate adjacent the ends 82 of the slot 38. As the slot 38 is not cut through the outer leg 18*b*, a thin bottom layer of plywood material remains throughout the cutaway portions of the slot 38. Where a thin bottom layer of material remains, the root sections and ends of the fingers 70 are defined with respect to the majority of the plywood material and not with respect to the remaining bottom layer of material.

The fingers 70 are cut so that the ends of the fingers 70 would interfere with the movement of the pin 42 along the arc 58. The fingers 70 may have a side face adjacent the pin 42 which is flat or which has a radius greater than that of the pin travel arc 58 so that the ends of the fingers 70 extend into the area which would be occupied by the pin 42 as the pin 42 moves through the travel section 60 of the slot 38 through arc 58. The root sections of the fingers 70 are located out of the travel path of the pin 42 and the fingers 70 gradually extend into the travel path of the pin 42 when moving towards the ends of the fingers 70. In the example lock mechanism 34, the pin 42 will contact the fingers 70 at a position which is approximately half way between the roots and the ends of the fingers 70 and begin to deflect the fingers 70 elastically as the pin 42 moves towards the ends of the fingers 70. As the pin 42 moves towards the end of its travel (e.g. to an end 82 of the slot 38) the finger 70 is deflected elastically by the pin 42 to move the finger end out of the travel path of the pin 42. When the pin 42 reaches the end 82 of the slot 38, the finger 70 can move back towards its un-deflected position. The pin 42 is held between the wall of the slot at the end 82 of the slot 38 and the end wall of the finger 70. In this position, the finger holds the pin 42 in the end 82 of the travel section 60 of the slot 38 and the pin 42 must again bend the finger 70 to move out of the end 82 of the travel section 60 of the slot 38. The fingers 70 thus create detent positions along the travel path of the pin 42. In the example slot 38, the detent positions hold the pin 42 between a slot end 82 and the end of a finger 70.

In the example piece of furniture 10, the legs 14, 18 are made of plywood. The slot 38 is cut into the plywood; leaving a small layer of uncut plywood across the bottom of the slot 38. In an example piece of furniture, the legs 14, 18 may be made from ½ inch or ¾ inch plywood and the slot 38 may be cut to a depth which is about 0.05 inch or about 0.1 inch less than the thickness of the plywood. This leaves a 0.05 inch or 0.1 inch layer of continuous plywood across the bottom of the slot 38. When the slot 38 is first formed, the finger 70 is attached to the uncut layer of plywood. When the pin 42 is moved for the first time, the pin 42 pushes the finger 70 laterally and the finger 70 is broken free from the underlying layer of plywood. The finger 70 typically breaks free near the plane at the bottom of the slot 38. The finger 70 breaks free relatively cleanly due to the low strength of plywood through a veneer layer. Once it is broken free, the finger 70 can bend out of the way of the pin 42 and allow the pin 42 to travel to the end wall 82 of the slot 38. The cross-grain nature of the plywood used to create the outer leg 18*b* allows the finger 70 to flex without breaking. In an example piece of furniture 10, the finger 70 will flex to move the end of the finger 70 between about 0.02 inches and about 0.05 inches as the pin 42 moves past the finger 70.

Figure 6B:
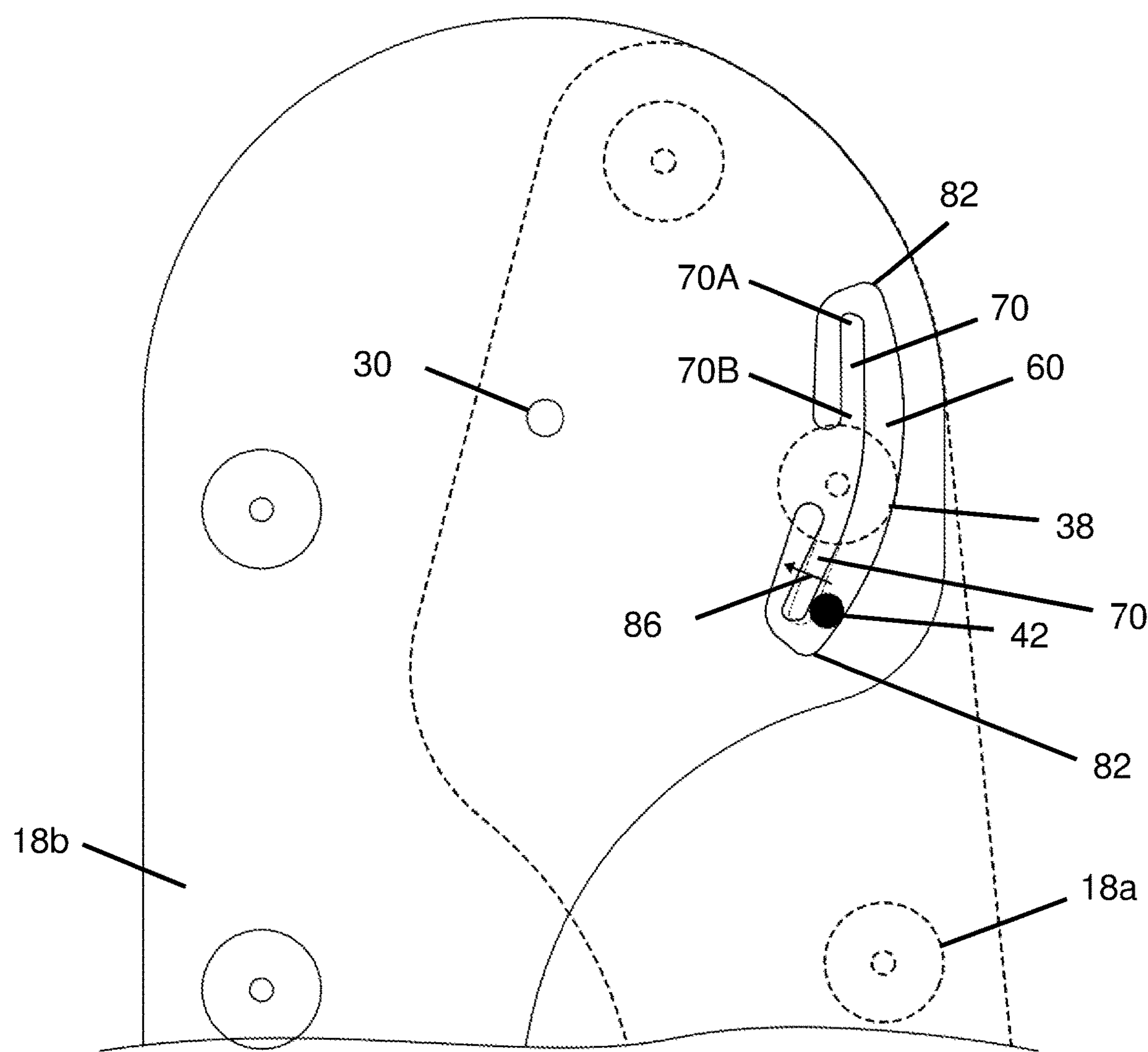
FIG. 6B is a drawing which shows a detailed view of the climbing triangle lock mechanism.

FIG. 6B shows a drawing which is similar to that of FIG. 6A with the inner leg 18*a* and the outer leg 18*b* rotated towards each other to place the furniture 10 a closed position. The pin 42 is accordingly moved towards the lower end 82 of the slot 38. The finger 70 is deflected away from its initial position (indicated by dashed lines) in the direction of arrow 86. If this was the first time moving the pin 42 to this end 82 of the slot 38, the finger would break free from the uncut layers of the plywood in shear. Subsequently, the finger 70 is free to bend elastically as the pin 42 moves through the travel section 60 of the slot 38. The deflected finger 70 pushes against the pin 42 and provides some resistance to movement. Similar deflection of the upper finger 70 would occur if the legs 18*a*, 18*b* were pivoted apart and the pin 42 was moved towards the upper end 82 of the slot 38. The upper finger 70 is labeled to show the locations of the finger end 70A and the finger root 70B.

Figure 6C:
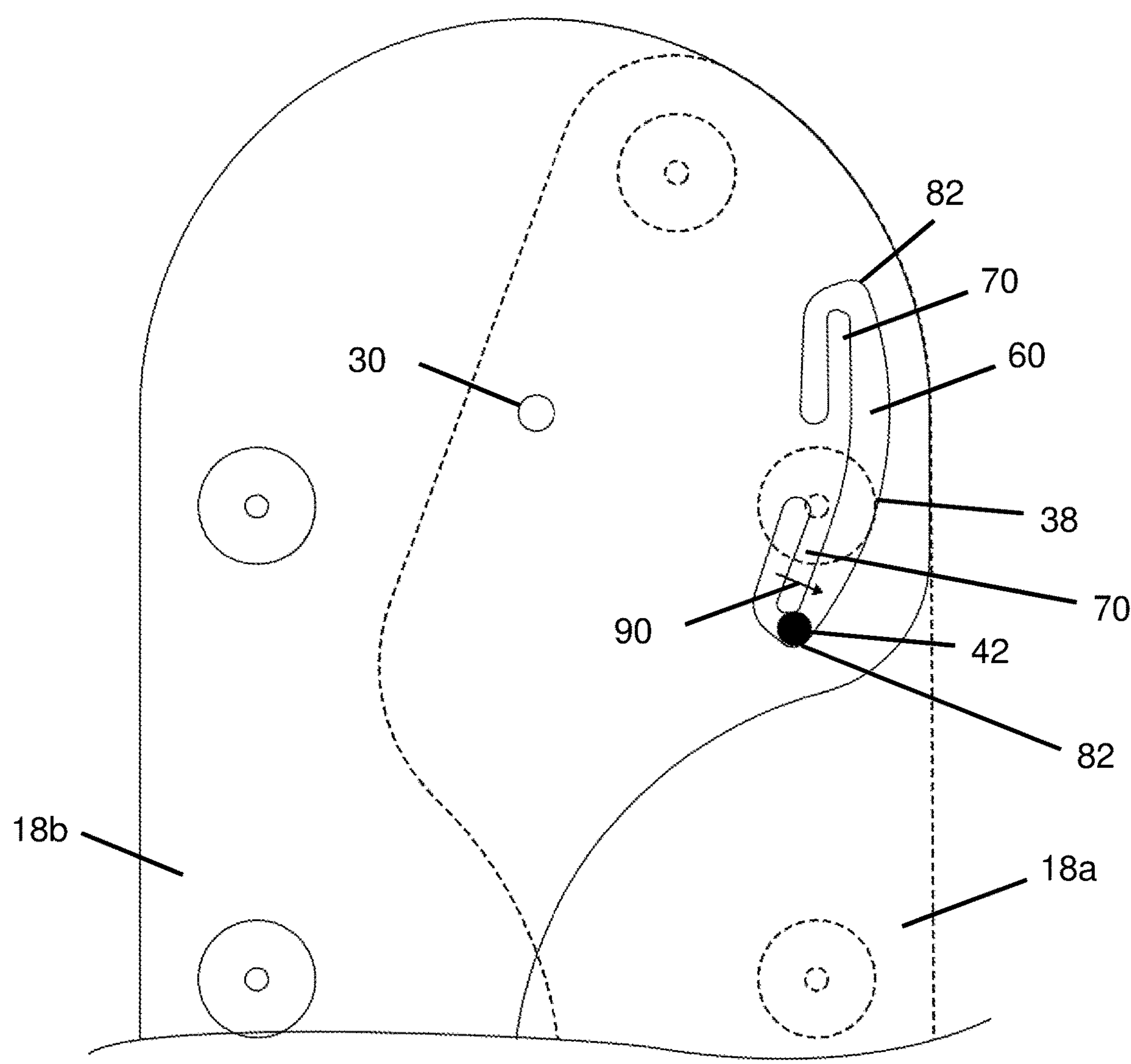
FIG. 6C is a drawing which shows a detailed view of the climbing triangle lock mechanism.

FIG. 6C shows a drawing which is similar to FIGS. 6A and 6B with the pin 42 moved to the end 82 of the slot 38. The end of the finger 70 is angled or rounded to provide some additional clearance for the pin 42 and to allow the pin 42 to more easily deflect the finger 70 and move out of the end 82 of the slot 38. The finger 70 can unbend towards its non-deflected position as indicated by arrow 90 when the pin 42 reaches the end 82 of the slot 38. The finger 70 may remain slightly bent while the pin 42 is at the end 82 of the travel section 60 of the slot 38 to remove slop from the piece of furniture 10. The upper finger 70 would move similarly when the pin 42 is moved to the upper end 82 of the slot 38. When the pin 42 is positioned at the end 82 of the travel section 60 of the slot 38, the finger 70 holds the pin 42 against the end 82 of the slot 38 and some force is required to deflect the finger (in the direction of arrow 86) and allow the pin 42 to move back towards the center of the travel portion 60 of the slot 38. Accordingly, the pin 42 is held against the end 82 of the slot 38 and the finger 70 holds the climbing triangle 10 in a closed position. The upper finger 70 would similarly hold the climbing triangle 10 in an open position by holding the pin 42 against the top end 82 of the slot 38. The fingers 70 may be designed so that the fingers 70 remain slightly bent when the pin 42 is positioned against the ends 82 of the slot 38. This will help prevent looseness in the holding the climbing triangle 10 in an open or closed position.

Figure 6D:
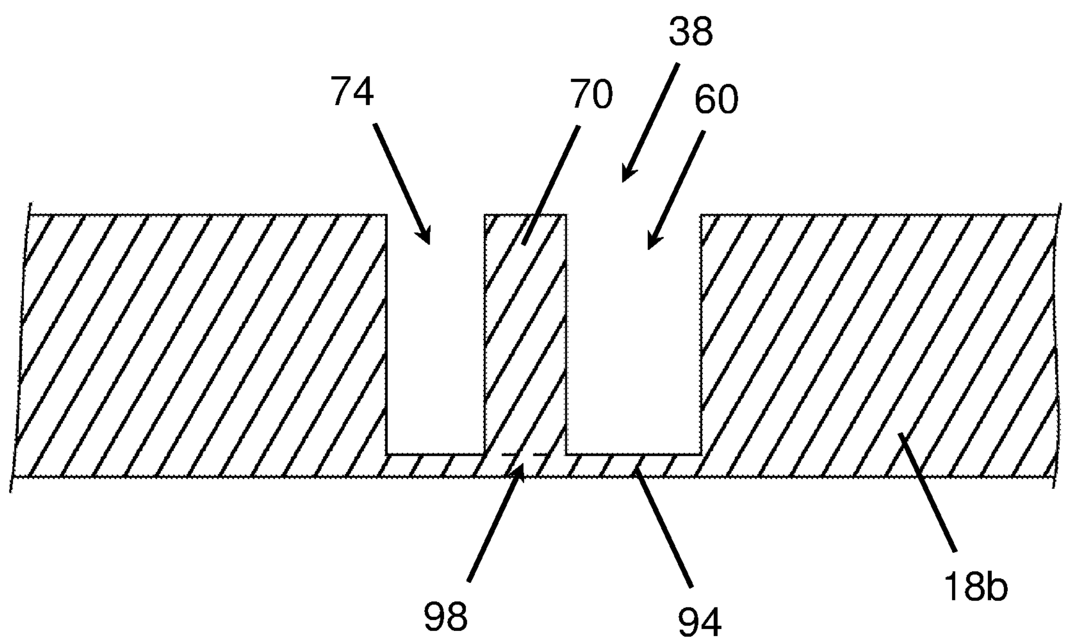
FIG. 6D is a drawing which shows a partial cross-sectional view of the lock mechanism slot.

FIG. 6D shows a partial cross-section of the outer leg 18*b* taken through the slot 38 and through a finger 70. The travel portion 60 of the slot 38 and the relief portion 74 of the slot 38 do not penetrate through the plywood used to create the outer leg 18*b*. Accordingly, a thin layer 94 of wood remains and extends across the slot 38. When the finger 70 is broken free during the first use of the climbing triangle 10, it typically breaks near the plane of the thin layer 94 of continuous wood as indicated at 98. If the slot 38 cuts completely through the leg 18*b*, the furniture would be less visually appealing and may provide a location where fingers may be pinched.

For the example design of the pin 42 and slot 38, both the pin 42 and slot 38 may be concealed between the overlapping portions of the inner leg 18*a* and outer leg 18*b*. This is aesthetically pleasing. This is also beneficial because foreign objects are kept out of the slot 38; allowing the lock mechanism 34 to function properly. Children's fingers are also kept out of the slot 38; preventing injury.

Figure 7A:
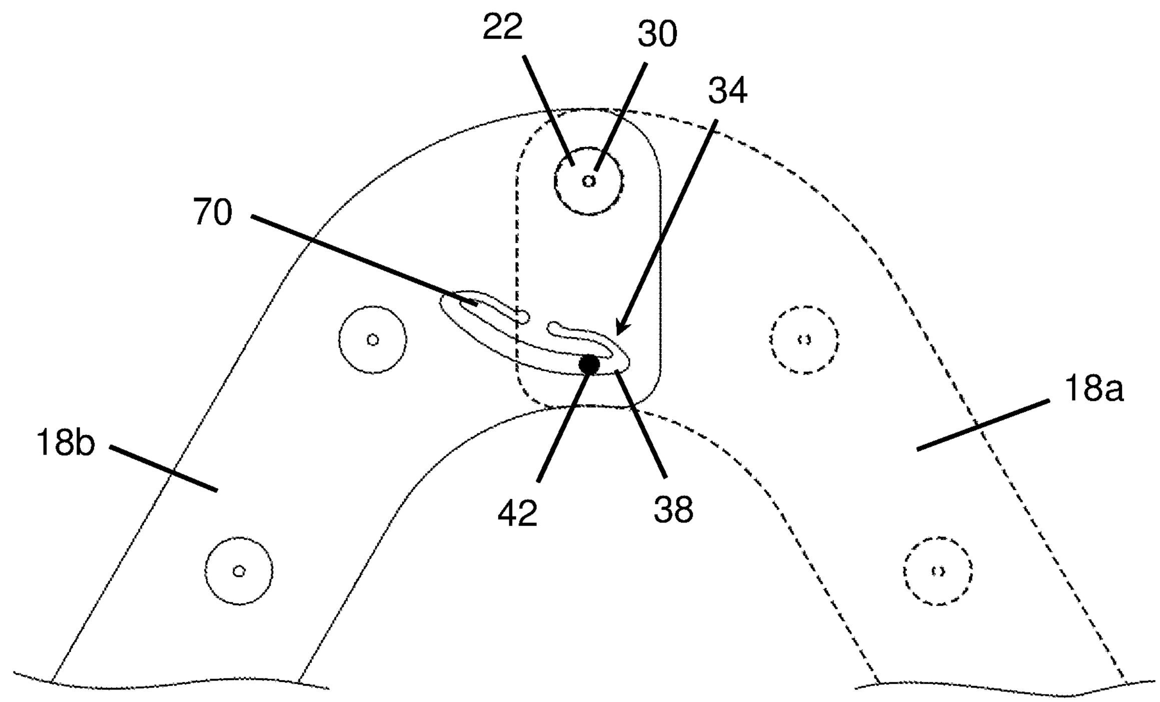
FIG. 7A is a drawing which shows a detailed view of an alternate configuration of the climbing triangle lock mechanism.
Figure 7B:
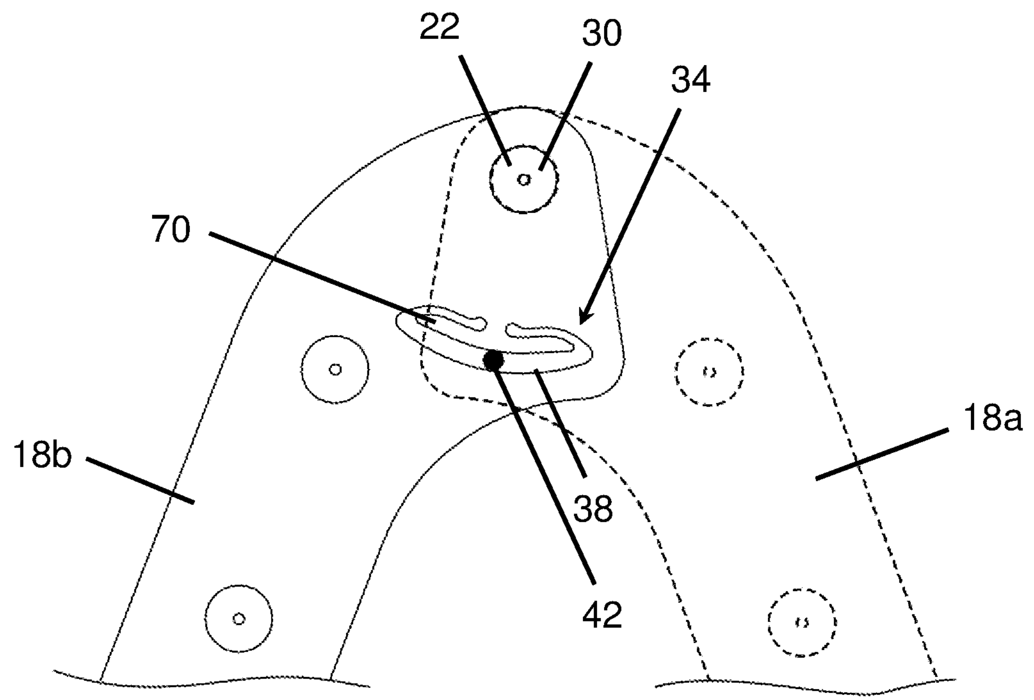
FIG. 7B is a drawing which shows a detailed view of the alternate configuration of the climbing triangle lock mechanism.

FIGS. 7A and 7B show an alternate design for the climbing triangle 10 and the lock mechanism 34. In this design for a climbing triangle 10, the pivot 30 may be coincident with the upper step 22. Alternatively, the upper step 22 may be used as the pivot 30. The lock mechanism 34 is positioned below the pivot 30. The lock mechanism 34 works as described above, with the pin 42 moving in an arc through the travel section 60 of the slot 38 between the ends of the slot 38. Fingers 70 hold the pin 42 against the ends of the slot 38. The slot 38 and pin 42 could be concealed completely between the inner leg 18*a* and outer leg 18*b* by extending the ends of the legs around the lock mechanism 34. FIG. 7A shows the climbing triangle near the open position and FIG. 7B shows the climbing triangle half way between the open and closed positions.

While a climbing triangle 10 is shown as an example piece of furniture, the lock mechanism 34 could also be used in other pieces of furniture to control motion of a moving/pivoting element. For example, the lock mechanism 34 could be used to allow legs to fold inwardly against a table base in a closed position and outwardly from the table base in an open position. The lock mechanism 34 could also be used to allow legs or supports to fold open or closed in furniture items such as towel or blanket racks, foot rests, tables, chairs, etc.

Figure 8A:
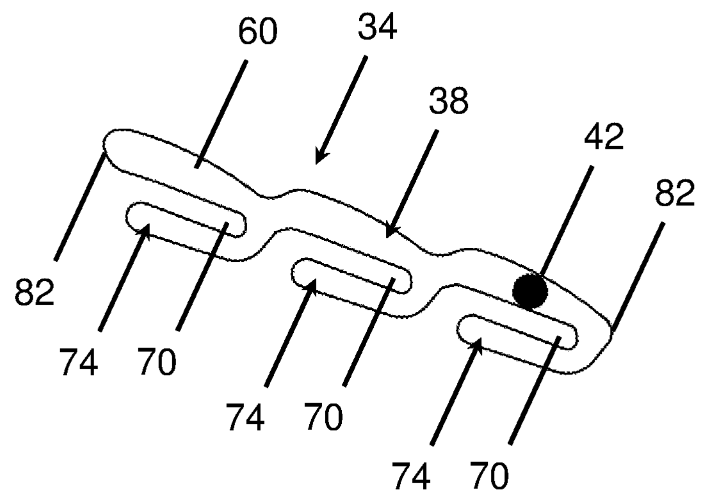
FIG. 8A is a drawing which shows another embodiment of the lock mechanism.
Figure 8B:
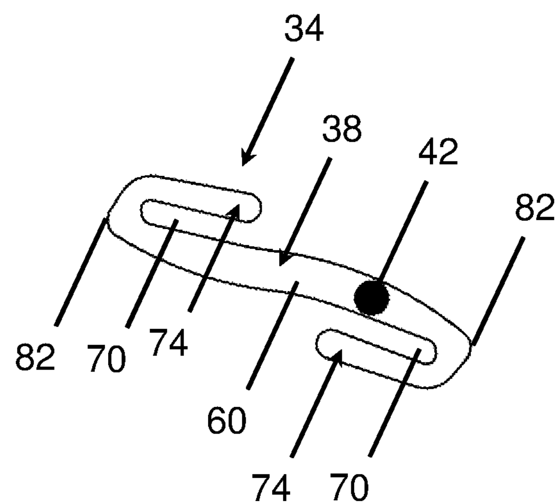
FIG. 8B is a drawing which shows another embodiment of the lock mechanism.

FIGS. 8A through 8F show alternate configurations of the lock mechanism 34 which may be used to control motion of furniture members. FIG. 8A shows another embodiment of the lock mechanism 34. The slot 38 is disposed with a travel section 60 which is substantially linearly and the pin 42 moves mostly linearly along the length of the slot 38. Three fingers 70 will stop the pin 42 at three detent positions along the slot 38. Such a linearly arranged slot 38 may be used with a piece of furniture where a movable panel is adjustable between three positions. FIG. 8B shows a similar linearly arranged slot 38 where fingers 70 are disposed on opposite sides of the slot 38 and hold the pin 42 against ends of the slot 38.

Figure 8C:
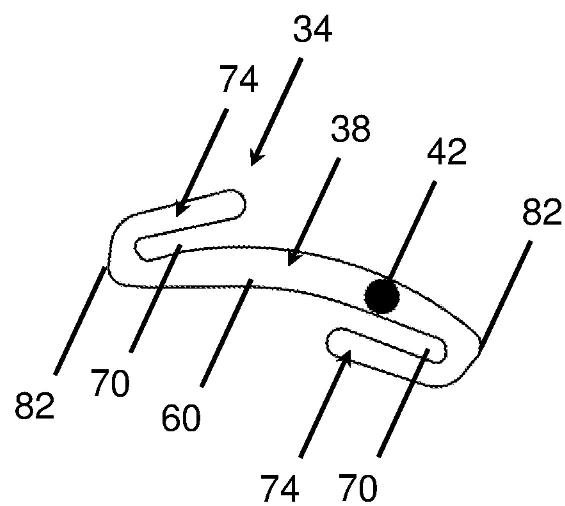
FIG. 8C is a drawing which shows another embodiment of the lock mechanism.
Figure 8D:
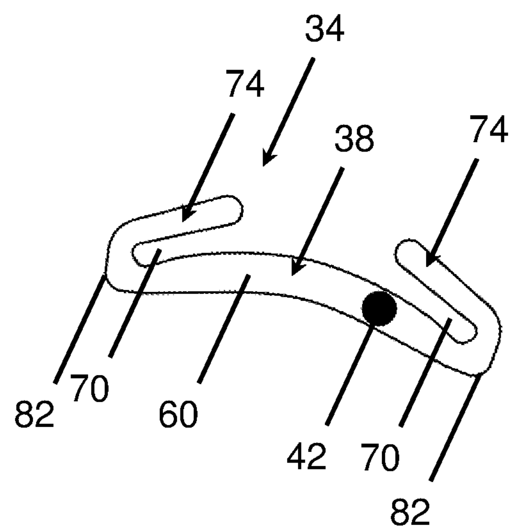
FIG. 8D is a drawing which shows another embodiment of the lock mechanism.

FIG. 8C shows a lock mechanism 34 with a curved slot 38 travel section 60 where fingers 70 are disposed on opposite sides of the slot 38. The pin 42 moves in an arc along the slot 38 about a pivot as discussed with the climbing triangle 10 above. The fingers 70 will deflect and hold the pin 42 against the ends of the slot 38. FIG. 8D shows a similar lock mechanism 34 where both fingers 70 are disposed on the outside of the slot 38, relative to the pivot 30. The fingers 70 intrude into the path of the pin 42 and will deflect outwardly from the pivot as the pin 42 moves through the travel section

60 towards the ends 82 of the slot 38. The fingers 70 will hold the pin 42 against the ends of the slot 38 as discussed above.

Figure 8E:
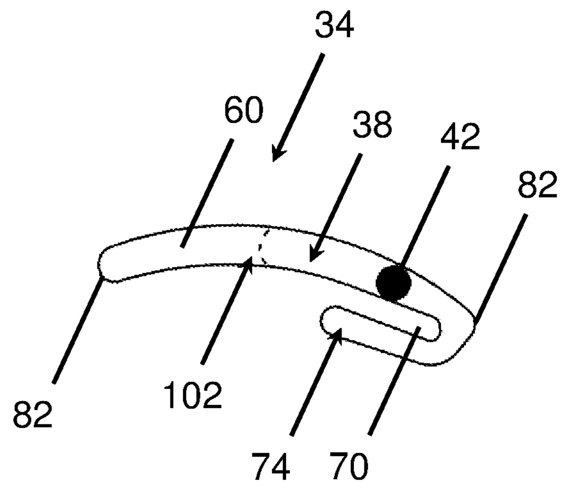
FIG. 8E is a drawing which shows another embodiment of the lock mechanism.

FIG. 8E shows a single sided lock mechanism 34 where the pin 42 is held against one end 82 of the slot 38 by a finger 70. The pin 42 is not constrained at the other end of the slot 42. Such a lock mechanism may hold an article open or closed without constraint in the other position. FIG. 8E also illustrates how the slot 38 may be lengthened or shortened as indicated at 102 by lengthening or shortening the travel section 60 of the slot 38. This allows the range of motion of the lock mechanism 34 to be changed. The slot 38 may be lengthened or shortened by lengthening or shortening its length between ends to change the angular movement of the pin 42 between ends. This will change the angular deployment of the legs 18. Slots with two or more fingers 70 may similarly be lengthened or shortened by adding or removing length in the middle of the slot 38.

Figure 8F:
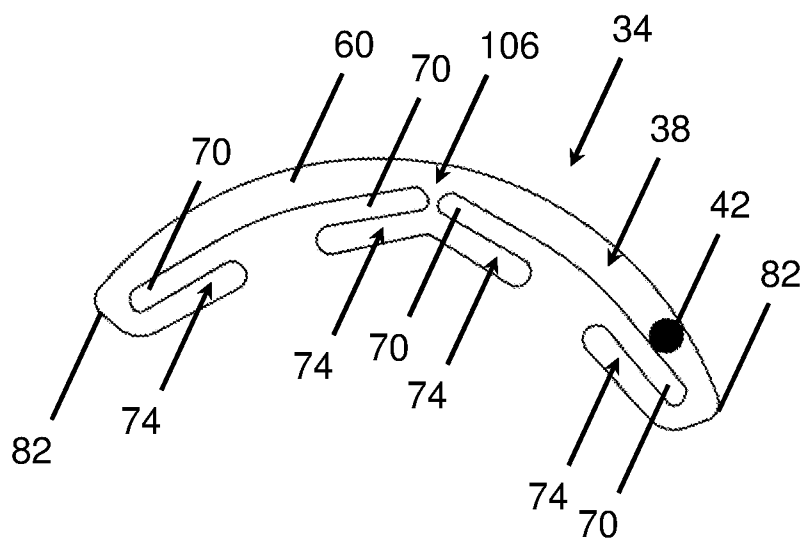
FIG. 8F is a drawing which shows another embodiment of the lock mechanism.

FIG. 8F shows show a lock mechanism 34 with three detent positions along an arcuate travel section 60 of the slot 38. The pin 42 may move along an arcuate path about a pivot 30 as discussed. The lock mechanism may include four fingers 70; two adjacent ends 82 of the slot 38 and two adjacent a center or intermediate position 106 along the slot 38. Each finger 70 is formed between the travel section 60 of the slot 38 and a relief cut 74. As the pin 42 moves towards the intermediate position 106, one of the central fingers 70 deflects. At the central position 106, both fingers 70 may be slightly deflected and the pin 42 is held between two fingers 70. The lock mechanism 34 may thus hold a pin 42 at three or more detent positions along an arcuate travel path.

Figure 9:
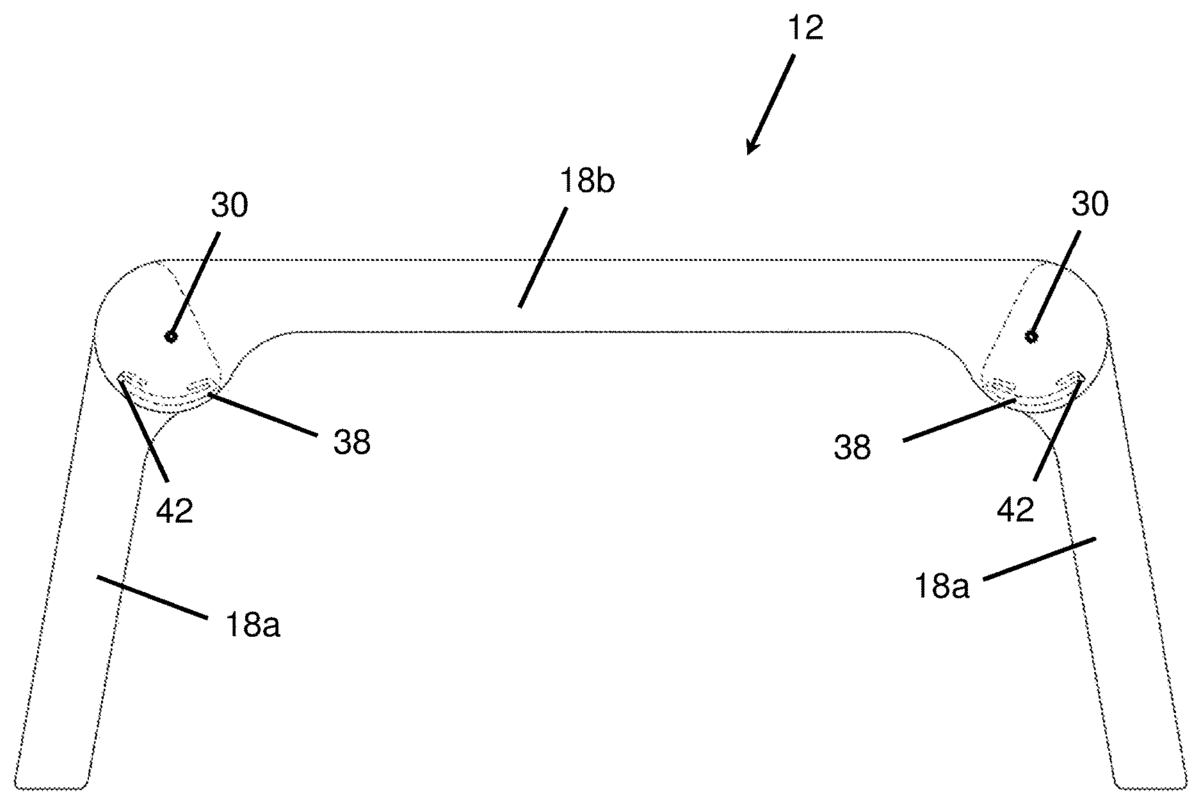
FIG. 9 is a drawing which shows a folding table using the lock mechanism.

FIG. 9 shows a side view of an example table using the lock mechanism to allow pivoting and positional control of table legs. In the example table 12, the first furniture members are table legs 18*a* and the second furniture member is a table rail or frame member 18*b*. The top ends of the legs 18*a* and the ends of the table rail 18*b* are cut in a circular shape around the pivot 30. This forms a smooth and pleasing shape. The bottoms of the legs 18*a* are cut to provide stable footing on a floor surface. The lock mechanisms 34 are located between the legs 18*a* and the table rail 18*b* around the pivot 30. The lock mechanisms 34 are formed and function as describe above, except for extending in a larger angle around the pivot 30 to allow the table legs 18*a* to pivot through a greater angle around the pivot. The table legs 18*a* may pivot approximately 100 degrees to fold up parallel to the table rail 18*b*. The lock mechanisms 34 include a slot 38 and a pin 42 which moves within the slot 38. The pin 42 is placed in a hole 54 which is formed in the legs 18*a*. The slots 38 are formed in the table rail 18*b*. Alternatively, the pins 42 could be located in the table rail 18*b* with the slots 38 located in the legs 18*a*. During use of the table 12, the legs 18*a* are pivoted about the pivot 30 to open the table legs for use or to close the table legs for storage. As the legs 18*a* are pivoted relative to the table frame rail 18*b*, the pin 42 moves within the slot 38 between a first end of the slot 38 and a second end of the slot 38. The pin 42 is held at the first end of the slot 38 or the second end of the slot 38 by a flexible finger 70 which engages the pin 42.

The lock mechanism is well suited for furniture made from plywood. It is beneficial as it maintains the clean aesthetic of the furniture. It also avoids the use of complex fasteners or additional parts. The lock mechanism 34 may be easily cut into a plywood panel with a CNC router while the furniture piece is being cut. It does not require a tool change or specialized bit. The lock mechanism may be cut blind into the plywood panel without penetrating through the panel and the fingers are broken free during use. At the ends of motion, the lock mechanism prevents hyperextended motion by abutting the pin against the plywood panel, retaining significant strength. Accordingly, the lock mechanism is suitable for use in furniture such as the climbing triangle 10 where collapse due to hyperextension must be avoided.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A piece of furniture comprising:
a first furniture member;
a second furniture member;
a joint connecting the first furniture member and the second furniture member and allowing relative motion between the first furniture member and the second furniture member, the joint comprising a lock mechanism comprising:
a pin extending from the first furniture member;
a slot formed in the second furniture member, the slot comprising:
a travel section extending between a first position and a second position;
a first finger formed along the travel section, the first finger comprising an end disposed adjacent the first position;
wherein the slot does not penetrate through the second furniture member such that a layer of material spans a bottom of the slot and connects the first finger to the second furniture member;
wherein the pin moves through the slot travel section in a travel path between the first position and the second position during relative motion between the first furniture member and the second furniture member;
wherein the first finger end extends into the pin travel path; and
wherein movement of the pin towards the first position elastically bends the first finger.

2. The piece of furniture of claim 1, wherein the second furniture member is made from wood, wherein the second furniture member is manufactured in a first configuration wherein the first finger is attached to the layer of material which spans the bottom of the slot, and wherein initial movement of the pin to the first position breaks the finger free from the layer of wood and allows for subsequent elastic bending of the first finger.

3. The piece of furniture of claim 1, wherein positioning the pin at the first position allows the first finger to unbend elastically whereby the first finger holds the pin in the first position.

4. The piece of furniture of claim 1, further comprising a connecting slot section extending generally perpendicular to the travel path from a position adjacent the first position and a relief slot section extending generally parallel to the travel path and disposed adjacent the first finger on a side of the first finger opposite the slot travel section.

5. A piece of furniture comprising:

a first furniture member;

a second furniture member;

a pivot joint connecting the first furniture member and the second furniture member and allowing relative pivotal motion between the first furniture member and the second furniture member;

a lock mechanism comprising:

a pin attached to and extending from the first furniture member;

a slot formed in the second furniture member, the slot comprising:

a travel section extending between a first position and a second position;

a first slot end at the first position;

a first slot relief section;

wherein the first slot relief section is offset from the travel section and is connected to the first slot end so that a first finger is formed between the travel section and the first relief section;

wherein the second furniture member is made from wood, and wherein the slot does not penetrate through the wood such that a layer of wood spans a bottom of the slot;

wherein the pin moves through the slot travel section in a travel path between the first position and the second position during pivoting motion between the first furniture member and the second furniture member;

wherein the first finger extends into the travel path;

wherein movement of the pin towards the first position elastically bends the first finger;

wherein positioning the pin at the first position allows the first finger to unbend elastically; and wherein the first finger holds the pin in the first position.

6. The piece of furniture of claim 5, wherein the first finger extends generally parallel to the travel path.

7. The piece of furniture of claim 5, wherein the first finger comprises a root which is attached to the second furniture member and an end and is elongate between the root and the end.

8. The piece of furniture of claim 7, wherein the finger root does not extend into the pin travel path, wherein the finger end does extend into the travel path, and wherein the finger end is displaced laterally as the pin moves towards the first position.

9. The piece of furniture of claim 8, wherein the finger end is displaced laterally between about 0.01 inches and about 0.05 inches as the pin moves towards the first position.

10. The piece of furniture of claim 7, wherein, when the pin is disposed in the first position, the pin is held against a wall of the slot at the first slot end and the end of the finger.

11. The piece of furniture of claim 5, wherein the travel path is an arcuate path centered about the pivot joint.

12. The piece of furniture of claim 1, wherein the second furniture member is manufactured in a first configuration wherein the first finger is attached to the layer of wood and wherein initial movement of the pin to the first position breaks the finger free from the layer of wood and allows for subsequent elastic bending of the first finger.

13. The piece of furniture of claim 5, wherein the slot comprises:

a second slot end at the second position;

a second slot relief section;

wherein the second slot relief section is offset from the travel section and is connected to the second slot end so that a second finger is formed between the travel section and the second relief section;

wherein the second finger extends into the travel path;

wherein movement of the pin towards the second position elastically bends the second finger;

wherein positioning the pin at the second position allows the second finger to unbend elastically; and wherein the second finger holds the pin in the second position.

14. The piece of furniture of claim 5, wherein the first furniture member and the second furniture member collectively comprise a first leg and a second leg, and wherein pivoting the first leg and the second leg to move the pin into the first position creates a triangular frame, and wherein steps are attached to the first leg and the second leg to form a climbing triangle.

15. The piece of furniture of claim 5, wherein one of the first furniture member and the second furniture member comprises a leg and wherein pivoting the first furniture member and the second furniture member to move the pin into the first position moves the leg into a deployed position to use the furniture.

16. The piece of furniture of claim 5, wherein the slot comprises a first connecting section which extends generally perpendicularly to the travel section of the slot and wherein the first slot relief section extends generally parallel to the travel section of the slot.

17. A piece of furniture comprising:

a first furniture member;

a second furniture member;

a pivot joint connecting the first furniture member and the second furniture member and allowing relative pivotal motion between the first furniture member and the second furniture member;

a lock mechanism comprising:

a pin attached to and extending from the first furniture member;

a slot formed in the second furniture member, the slot comprising:

a travel section extending between a first position and a second position;

a first finger formed along the travel section, the first finger comprising an end disposed adjacent the first position;

wherein the pin moves through the slot travel section in a travel path between the first position and the second position during pivoting motion between the first furniture member and the second furniture member;

wherein the first finger end extends into the pin travel path; and wherein movement of the pin towards the first position elastically bends the first finger; and wherein the second furniture member is made from wood, and wherein the slot does not penetrate through the wood such that a layer of wood spans a bottom of the slot, and wherein the second furniture member is manufactured in a first configuration wherein the first finger is attached to the layer of wood and wherein initial movement of the pin to the first position breaks the finger free from the layer of wood and allows for subsequent elastic bending of the first finger.

18. The piece of furniture of claim 17, wherein positioning the pin at the first position allows the first finger to unbend elastically and wherein the first finger holds the pin in the first position.

19. The piece of furniture of claim 17, further comprising a connecting slot section extending generally perpendicular to the travel path from a position adjacent the first position and a relief section extending generally parallel to the travel path and disposed adjacent the first finger on a side of the first finger opposite the slot travel section.

20. The piece of furniture of claim 17, wherein one of the first furniture member and the second furniture comprises a leg and wherein pivoting the first furniture member and the second furniture member to move the pin into the first position moves the leg into a deployed position to use the furniture.

* * * * *